United States Patent [19]

Kishi et al.

[11] Patent Number: 5,687,083
[45] Date of Patent: Nov. 11, 1997

[54] VEHICLE-GUIDING DEVICE FOR RECOGNIZING CURVED ROAD AND LEADING VEHICLE ALONG CURVED ROAD AURALLY

[75] Inventors: Hiroshi Kishi, Toyota; Toru Ito, Nagoya; Kyomi Morimoto, Nishio; Shoji Yokoyama, Anjo; Kenji Kuroda, Sabae, all of Japan

[73] Assignee: Aisin AW Co., Anjo, Japan

[21] Appl. No.: 788,205

[22] Filed: Jan. 24, 1997

Related U.S. Application Data

[63] Continuation of Ser. No. 426,900, Apr. 21, 1995, abandoned, which is a continuation of Ser. No. 92,815, Jul. 19, 1993, Pat. No. 5,444,629.

[30] Foreign Application Priority Data

| Jul. 20, 1992 | [JP] | Japan | 4-192528 |
| Jul. 21, 1992 | [JP] | Japan | 4-193572 |

[51] Int. Cl.⁶ ............................................. G06F 165/00
[52] U.S. Cl. ................... 364/449.5; 364/443; 340/990; 340/995
[58] Field of Search ................... 364/443, 449.1, 364/449.2, 449.3, 449.5; 73/178 R; 340/988, 990, 995

[56] References Cited

U.S. PATENT DOCUMENTS

| 4,688,176 | 8/1987 | Hirata | 364/449 |
| 4,937,751 | 6/1990 | Nimura et al. | 340/995 |
| 4,937,752 | 6/1990 | Nanba et al. | 364/449 |
| 4,939,662 | 7/1990 | Nimura et al. | 340/995 |
| 5,043,902 | 8/1991 | Yokoyama et al. | 364/449 |

FOREIGN PATENT DOCUMENTS

| 487280 | 5/1992 | European Pat. Off. |
| 60-13413 | 1/1985 | Japan |
| 1173815 | 7/1989 | Japan |
| 1173817 | 7/1989 | Japan |
| 2-4285 | 1/1990 | Japan |
| 2103584 | 4/1990 | Japan |
| 3137679 | 6/1991 | Japan |
| 3269317 | 11/1991 | Japan |

OTHER PUBLICATIONS

David et al, "The Back Seat Driver: Real Time Spoken Driving Instructions", IEEE, Sep. 11–13, 1989, 146–150.
Kishi et al, "Human Factor Considerations for Voice Route Guidance", SAE Paper No. 930553, Mar. 1993 p. 98–109.

*Primary Examiner*—Gary Chin
*Attorney, Agent, or Firm*—Cushman, Darby & Cushman IP Group of Pillsbury Madison & Sutro LLP

[57] ABSTRACT

A voice expression selection processing section recognizes a route from data from a route memory. When a vehicle has reached a junction, it is judged whether or not a curved road is present at the junction on the basis of connecting road number data from a junction data storage section, connecting angle data and connecting road width data. The content of the voice expression is changed in accordance with a case where the curved road is present or another case where the curved road is absent. Particularly, when the curved road is present, the direction of this curved road is added as a base of the voice expression. Therefore, the voice expression which matches with the feeling of a driver can be carried out to achieve suitable car guidance.

15 Claims, 13 Drawing Sheets

| θm(DEGREE) | AREA INCLUDING Ra | EXPRESSION TO BE ALLOTTED TO EACH AREA |
|---|---|---|
| −70≤θm<−40 |  | ① "TURN SO AS TO RETURN LEFT"<br>② "TURN LEFT"<br>③ "GO RIGHT"<br>④ "TURN RIGHT"<br>⑤ "TURN SO AS TO RETURN RIGHT" |
| −40≤θm<−10 |  | ① "TURN SO AS TO RETURN LEFT"<br>② "TURN LEFT"<br>③ "GO LEFT"<br>④ "GO RIGHT"<br>⑤ "TURN RIGHT"<br>⑥ "TURN SO AS TO RETURN RIGHT" |
| −10≤θm≤10 |  | ① "TURN SO AS TO RETURN LEFT"<br>② "TURN LEFT"<br>③ "GO OBLIQUELY LEFT"<br>④ "GO OBLIQUELY RIGHT"<br>⑤ "TURN RIGHT"<br>⑥ "TURN SO AS TO RETURN RIGHT" |
| 10<θm≤40 |  | ① "TURN SO AS TO RETURN LEFT"<br>② "TURN LEFT"<br>③ "GO LEFT"<br>④ "GO RIGHT"<br>⑤ "TURN RIGHT"<br>⑥ "TURN SO AS TO RETURN RIGHT" |
| 40<θm≤70 |  | ① "TURN SO AS TO RETURN LEFT"<br>② "TURN LEFT"<br>③ "GO LEFT"<br>④ "TURN RIGHT"<br>⑤ "TURN SO AS TO RETURN RIGHT" |

VEHICLE-GUIDING DEVICE FOR RECOGNIZING CURVED ROAD AND LEADING VEHICLE ALONG CURVED ROAD AURALLY

This is a continuation of application Ser. No. 08/426,900, filed on Apr. 21, 1995, which was abandoned upon the filing hereof which is a continuation of Ser. No. 08/092,815 filed Jul. 19, 1993, now U.S. Pat. No. 5,444,629.

BACKGROUND OF THE INVENTION (i) Field of the Invention

The present invention relates to a vehicle-guiding device which is mounted on a vehicle and which leads a driver along a route to a destination, and more specifically, it relates to a device for aurally informing a driver of a road to be selected (a guide road) at a junction.

(ii) Description of the Prior Art

In order to relieve the load of a driver during driving, various devices have heretofore been investigated, and some kinds of devices are already mounted on vehicles. Among these devices, there is a vehicle-guiding device for leading a vehicle along a road to a destination by inputting the destination to the device. This vehicle-guiding device has a mechanism for informing the driver of a route to be selected at a junction such as an intersection, and some mechanisms are known by which the route is displayed on a display, or a direction to be taken is announced at an intersection by voice.

For example, Japanese Utility Model Application Laid-open No. 13413/1985 discloses a device in which a course to be taken is specified from 8 directions (front, rear, right and left directions as well as oblique right and left directions) on the basis of an angle to an incoming direction at a junction by a voice expression to lead the vehicle along the course. According to such a vehicle led by the voice, a driver need not look at a display or the like, and thus leading the vehicle along the route can be achieved without having any bad influence on the driver. In this example, when the course to be taken is almost the same as the direction of travel, the course is judged to be straight, and so the aural guidance is omitted, whereby the unnecessary guidance is inhibited.

However, the above-mentioned conventional vehicle-guiding device has the constitution for omitting the guidance only when the route to be taken is judged to be straight on the basis of an angle to the incoming direction. Therefore, if a curved route is judged to be in the range of a right or left turn, the device gives the guidance inconveniently, even when the guidance is considered to be unnecessary for the curved route.

SUMMARY OF THE INVENTION

An object of the present invention is to provide a vehicle-guiding device in which when a vehicle goes along the curved road, a voice guidance will not be given, and when a vehicle goes along the road other than the curved road, a voice guidance based on the curved road is carried out to effectively lead of the vehicle.

The present invention is directed to a device for leading a vehicle along a road to a destination by issuing voice guidance at a junction, and this device comprises a map information storage means for storing map information inclusive of information about the structure of the junction, a judging means for judging whether or not a curved road is present at the junction from data regarding connecting roads at the junction, a voice expression deciding means for deciding a voice expression on the basis of the presence of the curved road, when it is judged from the judgement results in the judging means that the curved road is present, and a voice outputting means for outputting the voice in accordance with the voice expression decided in the voice expression deciding means.

According to the above-mentioned device, it is judged whether or not the curved road is present, and when the curved road is present, the voice expression is decided on the basis of this curved road. For example, in the case that while driving along a large road, the road is slightly curved on the right side at an intersection, a driver judges that this road is straight. In this case, the road judged to be straight is selected as the guide road at the intersection, but the voice expression of "go left" is selected, whereby the expression closer to the feeling of the driver can be given.

The present invention is also directed to a device further comprising a route memory for memorizing a route to a destination of the vehicle, and a present position recognizing means for recognizing the present position of the vehicle in addition to the above-mentioned means. In this case, the above-mentioned judging means suitably judges whether or not the curved road is present at the next junction, when it is recognized by the information from the present position recognizing means that the vehicle has reached the junction.

In consequence, the vehicle can be guided along the route to be selected.

The voice expression deciding means suitably controls the guidance voice expression so that the voice guidance may not be given, when: the presence of the curved road is judged by the judging means; it is judged in view of the route to the destination that the vehicle travels along the curved road; and, the vehicle actually goes along the curved road. Thus, in the case that the vehicle goes along the curved road, the voice guidance is omitted, whereby the unnecessary voice guidance can be prevented.

Furthermore, the above-mentioned voice expression deciding means suitably decides the voice expression of a road to be guided in compliance with an angle to the curved road, when: the presence of the curved road is judged; and the vehicle travels along a road other than this curved road. Thus, the voice guidance can be given, on the basis of the curved road, using a voice expression which matches the feeling of the driver.

In the data regarding the structure of the junction in the map information storage means, road width data and connecting angle data of the connecting road are included, and the above-mentioned judging means suitably judges whether or not the curved road is present from the road width data and the connecting angle data.

In the data regarding the structure of the junction in the map information storage means, there are contained data as to whether or not, for every incoming road to the junction, a connecting road is the curved road, and the judging means suitably judges on the basis of this data. Thus, the judgement as to whether or not the curved road is present can be easily carried out by having the data regarding the curved road included as the data of the connecting roads.

Another device of the present invention has a voice data storage section for storing a plurality of patterns for the voice guidance at each junction, and the above-mentioned voice outputting means reads a predetermined voice pattern from the voice data storage section on the basis of the decision of the voice expression deciding means, and then outputs the voice.

Still another device of the present invention further has a display guide means for displaying the route on a display to lead the vehicle, whereby the aural guidance and the guidance by the display are carried out together. In consequence, the vehicle guidance can be carried out by the combination of the voice guidance and the display guidance.

Moreover, in deciding the voice expression at the junction, the above-mentioned voice expression deciding means judges whether or not the decided voice expression is doubtful from the data of the structure of the junction and the connecting road to be selected by the vehicle, and if it is judged that the voice expression is doubtful, an expression for urging a driver to confirm the display is added to the output voice. Thus, the decision of the voice guidance can be effectively supplemented by the guidance on the display.

DETAILED DESCRIPTION OF PREFERRED EMBODIMENTS

Embodiments

Figure 1:
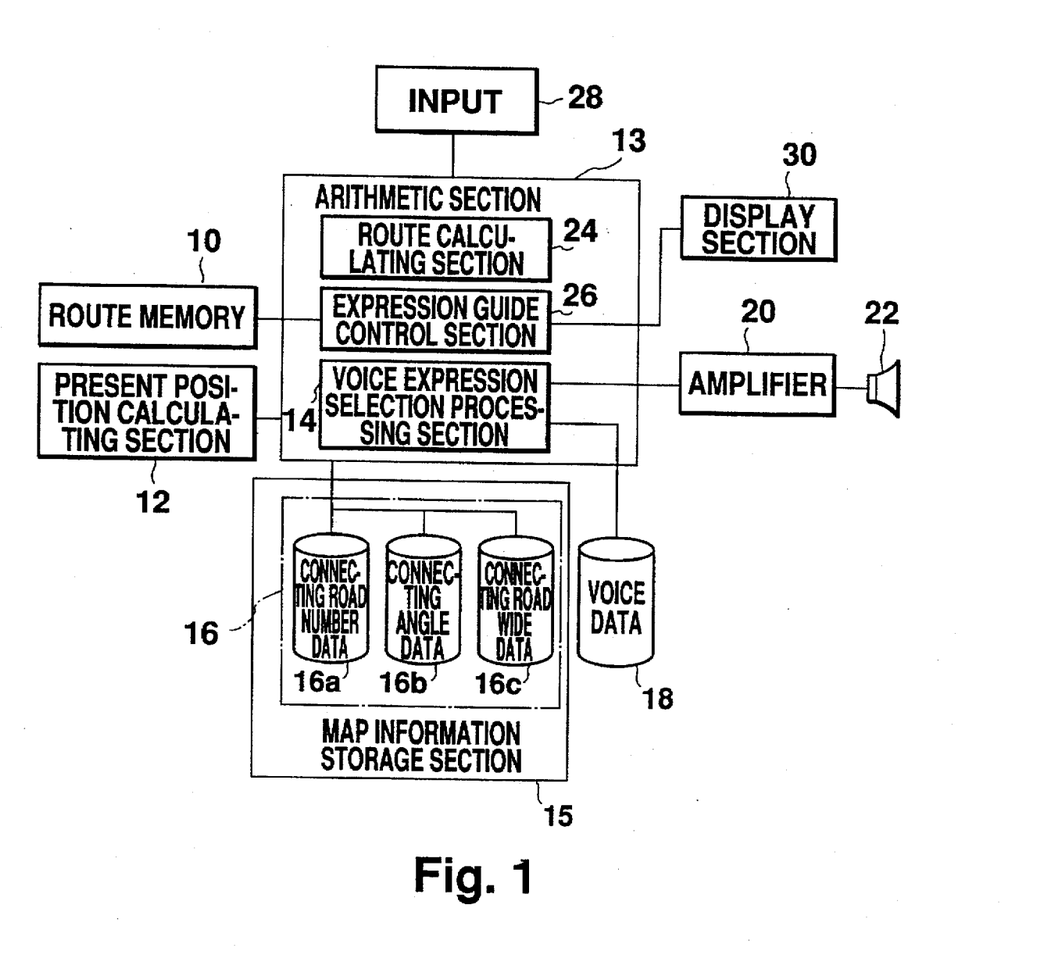
FIG. 1 is a block diagram showing a constitution of the present invention.

An embodiment of the present invention will be described in detail with reference to the drawings. FIG. 1 is a block diagram showing the overall constitution, and this constitution has a route memory 10 for memorizing a route to a destination and a present position calculating section 12 for calculating a present position of a car. The route memory 10 and the present position calculating section 12 are connected to an arithmetic section 13. In this arithmetic section 13, a voice expression selection processing section 14 is provided. The arithmetic section 13 is also connected to a map information storage section 15 for storing the information of roads, place names, building names, river names and the like, and in this map information storage section 15, a junction data storage section 16 for storing data about junctions of roads is provided. Furthermore, the arithmetic section 13 is connected to a voice data storage section 18 for storing data about voice expressions. In order to output the guidance voice, the arithmetic section 13 is connected to a speaker 22 via an amplifier 20. The above-mentioned junction data storage section 16 is composed of a connecting road number data storage section 16a, a connecting angle data storage section 16b and a connecting road width data storage section 16c.

In the arithmetic section 13, a route calculating section 24 and an expression guide control section 26 are provided, and the arithmetic section 18 is connected to an input section 28 in which various data are input by the operation of a driver and a display section 30 for various displays.

In the case that the leading of the car along a route is carried out by the use of such a device, a driver first operates the input section 28 to input the destination data. The route calculating section 24 decides a route to the destination from the destination data and the present position data (a starting point may be input, or the present position recognized by the car may be utilized as the starting point) in a predetermined route research manner. The obtained route is memorized in the route memory 10. On the other hand, the present position calculating section 12 always calculates the present position from data obtained by GPS (a global positioning system) or a dead reckoning method for detecting the present position from a running state of the car. With the traveling of the car, the present position calculating section 12 renews the present position and feeds its data to the arithmetic section 13.

The arithmetic section 13 reads the map information in the vicinity of the car from the map information storage section 15 and displays this map information on the display section 30 together with a present car position, driving direction and the route memorized in the route memory section 10 so that the information may overlap them.

Figure 2:
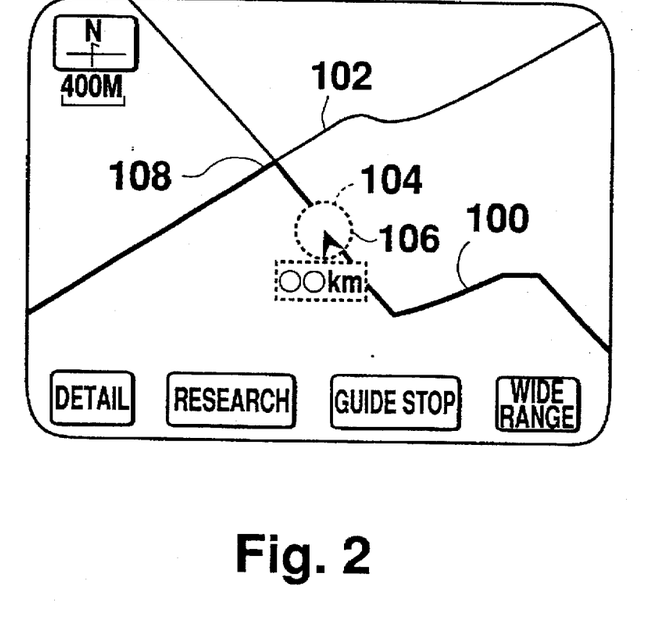
FIG. 2 shows a display example of a device of the present invention.

The display section 30 is arranged in an installment panel in the vicinity of a driver's seat, and the driver can look at the display section 30 to confirm the position of the car and to also obtain the information of the subsequent route. One example of this display is shown in FIG. 2. In FIG. 2, the selected route is represented by a bold solid line 100, and another road is represented by a thin solid line 102. The position of the car is shown by a circular symbol 104, and the driving direction of the car is shown by a wedge-like arrow 106. The plurality of roads can be discriminated from each other by the thickness of the lines or by the use of different colors.

Figure 3:
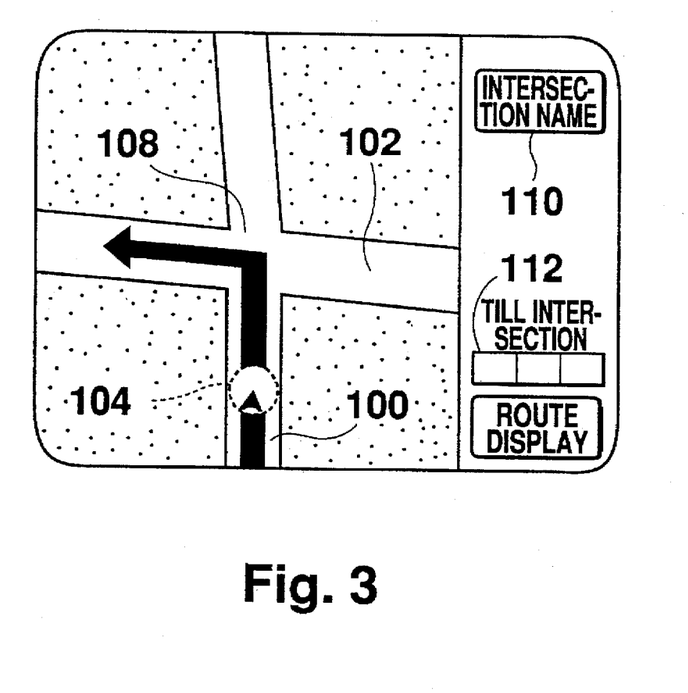
FIG. 3 shows a display example of the device of the present invention, and it is an enlarged view of an intersection at which a vehicle turns right or left.

When the car approaches a junction (an intersection) 108 where the driving direction of the car will be changed, the display changes into such a view as is shown in FIG. 3, in which an intersection name 110 and a distance 112 from the car to the intersection are displayed. In addition, simultaneously with this display change, guidance is given aurally. That is, when the car comes up to the junction, the voice expression selection processing section 14 selects the guidance voice data of this junction from the expression patterns stored in the voice data storage section 18, and the thus selected expression pattern is then fed to the speaker 22 via the amplifier 20. Thus, at this junction, the voice guidance is given so that the driver can select a certain route memorized in the route memory section 10. Consequently, the driver can recognize and select the road to be taken at each junction in accordance with the guidance output from the speaker 22.

In this embodiment, the voice expression selection processing section 14 selects the expression for the road selection which is considered to be most suitable from the expression patterns previously stored in the voice data storage section 18 on the basis of data such as the connecting road number, the connecting angle, the connecting road width and the like stored in the junction data storage section 16. Now, the operation of the voice expression selection processing will be described with reference to FIG. 4.

Figure 4:
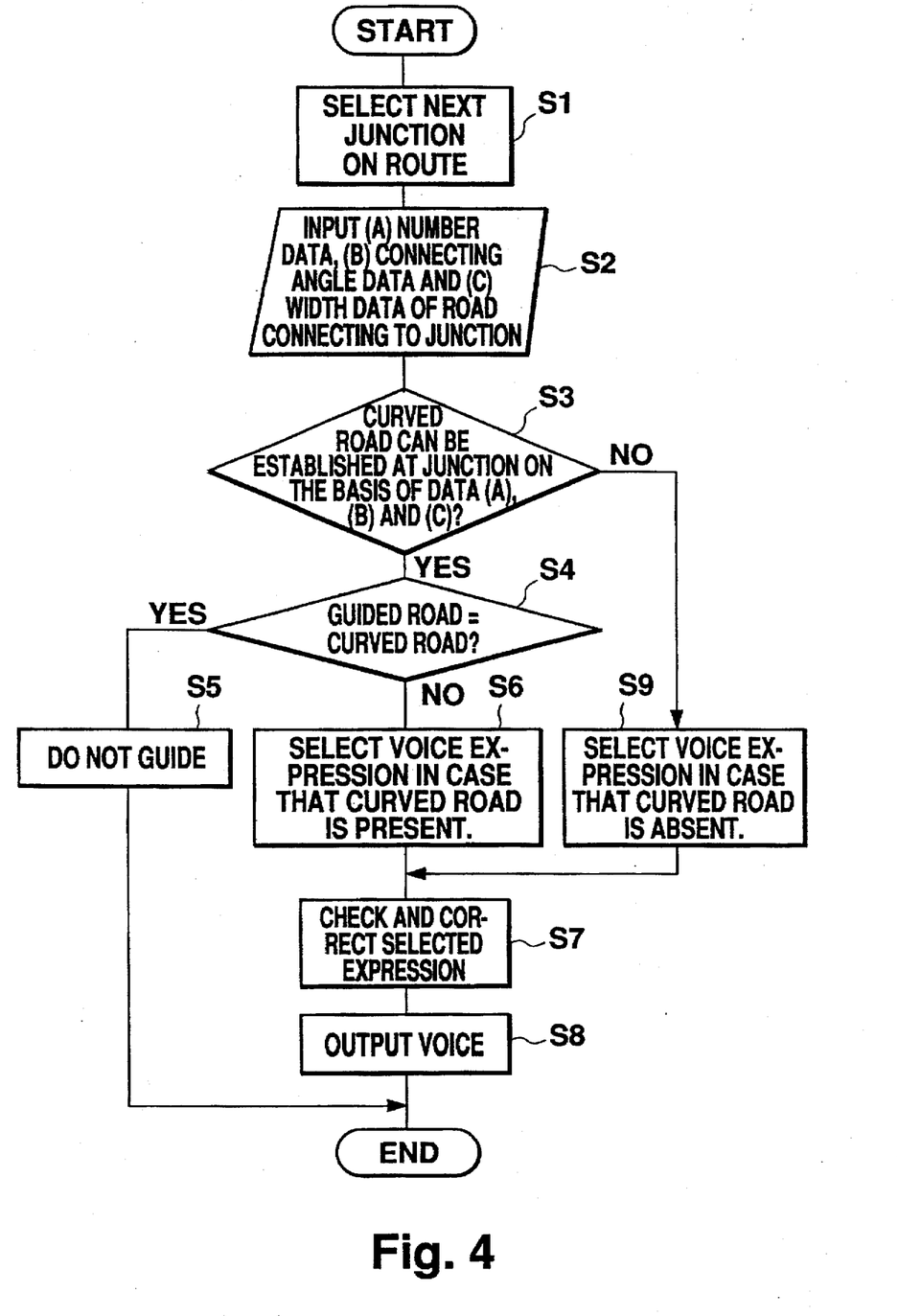
FIG. 4 is a flow chart illustrating the overall operation of the present invention including the flow of voice expression selection processing section to junction.

The voice expression selection processing section 14 selects the next intersection (the nearest junction) on the route on the basis of the data fed from the route memory section 10 (S1). Then, road number data (A), connecting angle data (B) and road width data (C) at the selected junction are read from a connecting road number data storage section 16a, a connecting angle data storage section 16b and a connecting road wide data storage section 16c of the junction data storage section 16, respectively (S2). Next, the voice expression selection processing section judges whether or not a curved road can be established at the junction on the basis of the data (A), (B) and (C) (S3). In the case that the curved road is established, it is judged whether or not the road to be selected (the guide road) is the curved road on the basis of the data from the route memory section 10 (S4). When the guide road is the curved road, the aural guidance is unnecessary, and therefore the guidance is not given (S5) and the processing is brought to an end. On the other hand, when the guide road is not the curved road, the voice expression indicating the presence of the curved road is selected (S6). On the other hand, when the curved road is not established in S3, the voice expression indicating the absence of the curved road is selected (S9).

Thus, in the case that the voice expression is selected in S6 or S9, the selected expression is checked and corrected (S7), and the processed expression is then fed to the speaker 22 via the amplifier 20 to output the voice (S8).

According to this embodiment, the different voice expression is selected in accordance with the presence or absence of the curved road at the junction. That is, when the curved road is present, the curved road is selected as the basis of the expression for specifying another road. Then, the voice expression having the meaning of "left of the curved road" or "right of the curved road" can be selected, whereby the voice guidance which matches with the feeling of the driver can be issued. On the other hand, when the curved road is not present, the proper voice guidance can be given on the basis of an angle to an incoming direction, and when the road is divided into two at the junction, simple guidance corresponding thereto can be given. Furthermore, when the guide road is the curved road, no guidance is necessary, even if the curved road has a slight angle to the incoming direction. Therefore, the guidance is omitted, whereby unnecessary guidance can be prevented.

Figure 5:
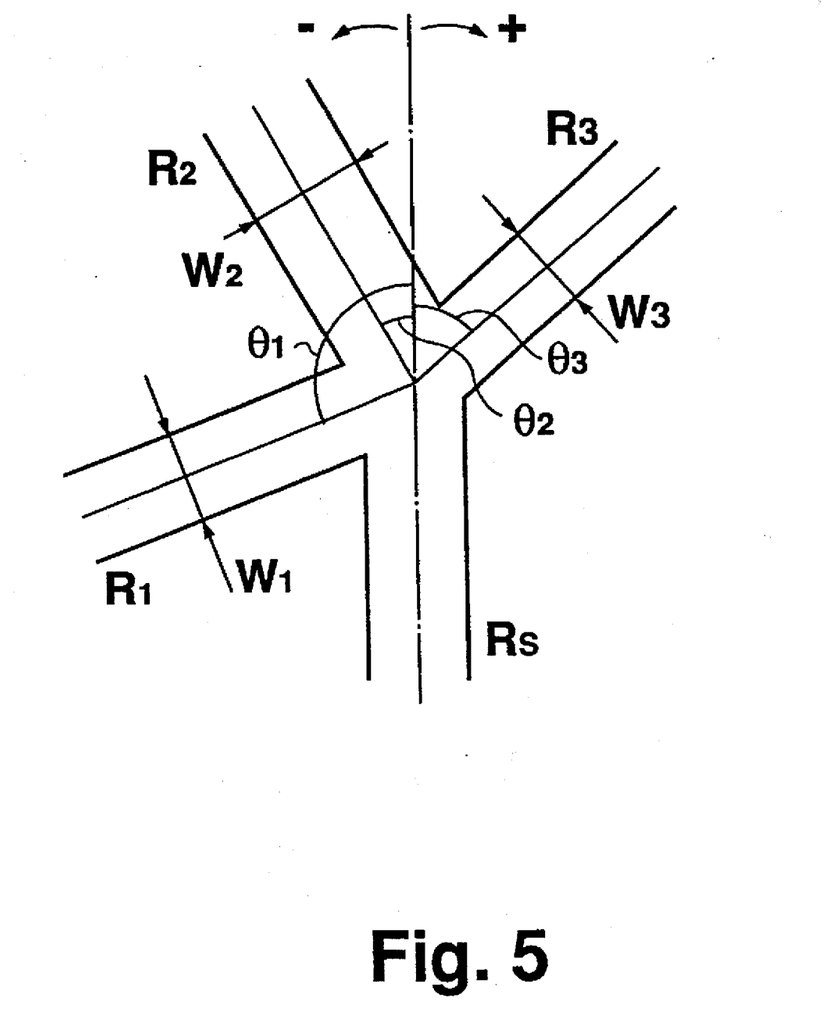
FIG. 5 is an illustrative view of a structure of a junction.

Next, the judgement as to whether or not the curved road is established at the junction of S3 in FIG. 4 will be described with reference to FIGS. 5 to 7. FIG. 5 is an illustrative view showing an example of the structure of the junction. The road on which the car is driving is represented by Rs (incoming road) and three roads connecting to the junction are represented by R1 to R3. The widths of the roads R1 to R3 are denoted by W1 to W3, respectively. The connecting angles of the roads R1 to R3 to the direction of the incoming road Rs are $\theta 1$ to $\theta 3$, respectively. Data regarding the junction are stored in the junction data storage section 16, and thus, in this section, there are stored the number of the connecting roads, the connecting angles $\theta 1$ to $\theta 3$ and the road width data W1 to W3 of the roads R1 to R3 at this junction.

Figure 6:
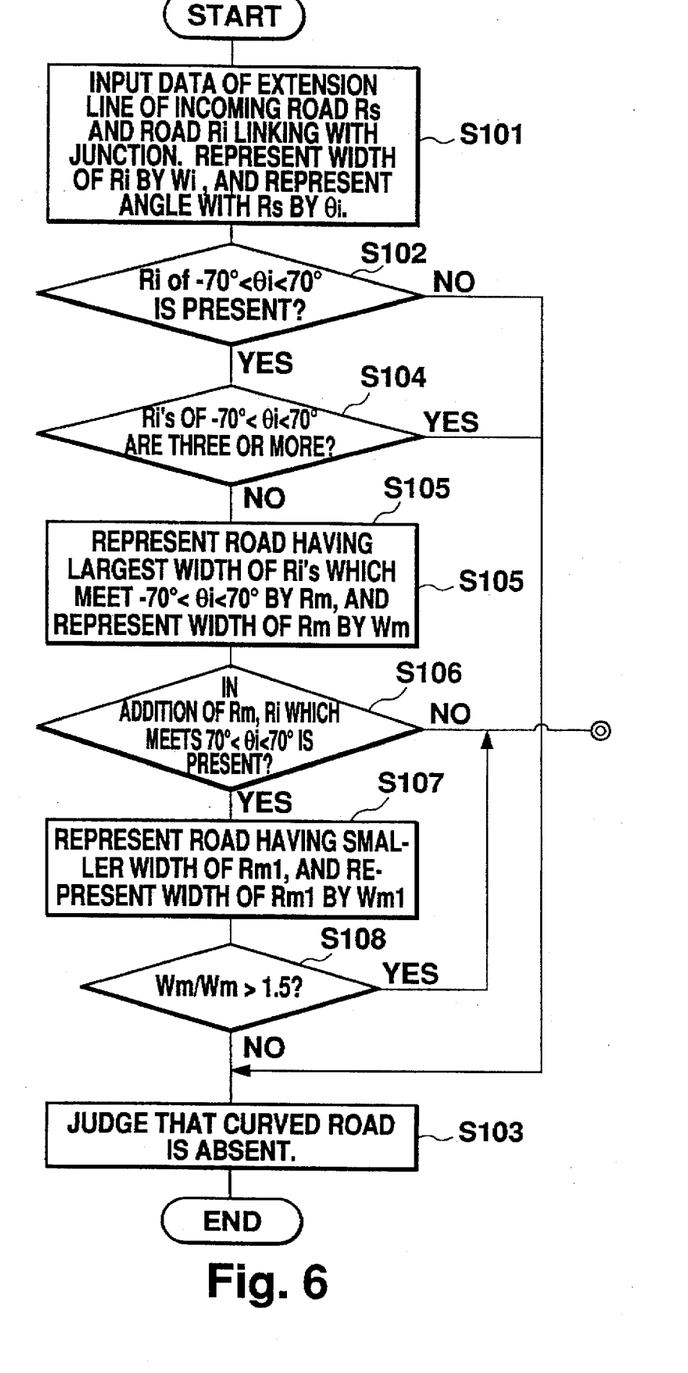
FIG. 6 is a flow chart for judging presence/absence of a curved road.
Figure 7:
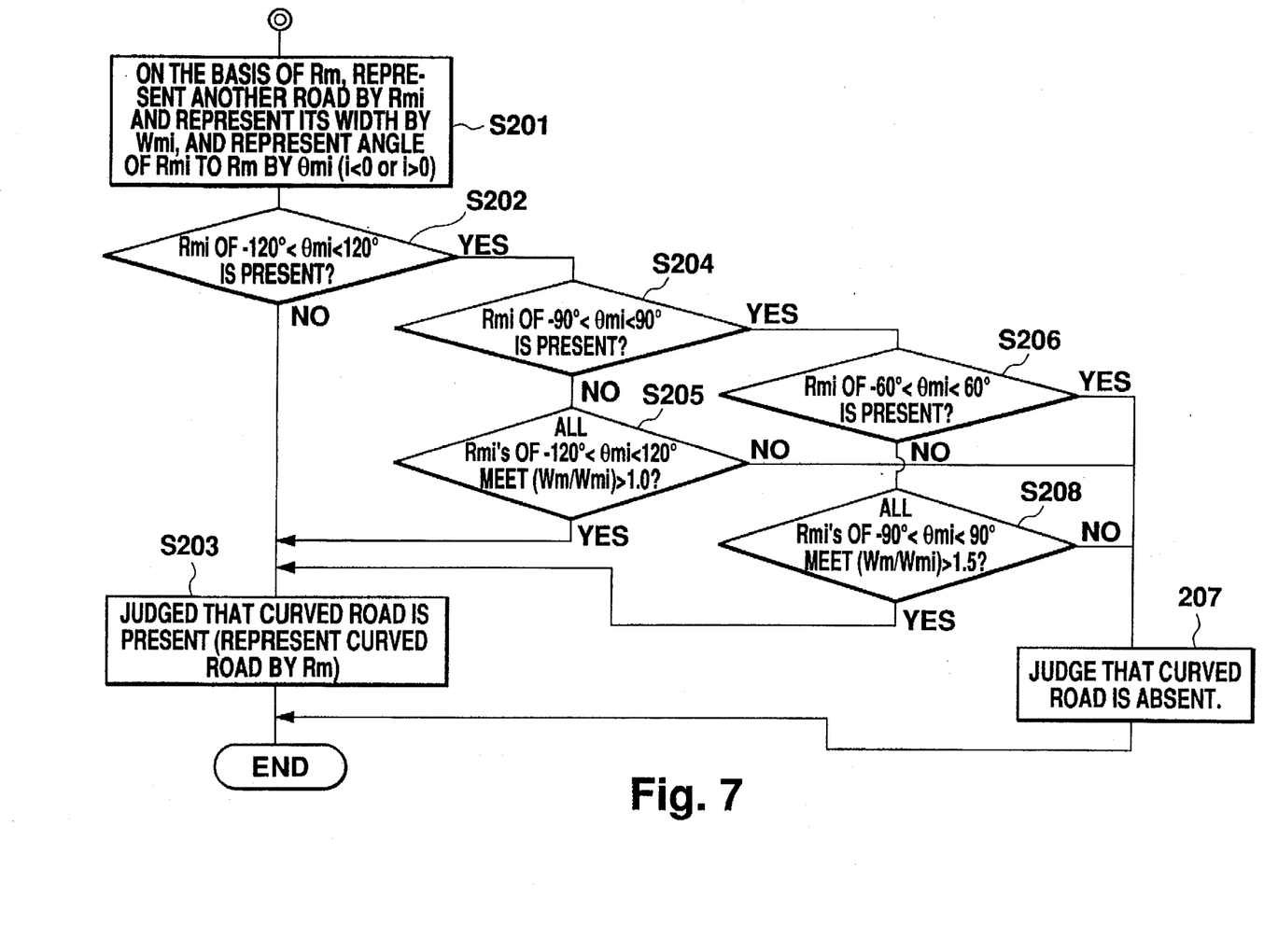
FIG. 7 is another flow chart for judging presence/absence of the curved road.

The voice expression selection processing section 14 judges presence/absence of the curved road in accordance with flow charts in FIGS. 6 and 7. In the first place, data about the direction of an extension line of the incoming road Rs and data of another road Ri linking with the junction are input to the voice expression selection processing section 14. The $i$ of Ri is a symbol for discriminating the road, and in an example of FIG. 5, $i$ is any of 1 to 3. The width Wi of each road Ri and an angle $\theta 1$ of the road Ri to the extension line of the incoming road Rs are also input thereto (S101). For example, in the case of the example shown in FIG. 5, W1 to W3 and $\theta 1$ to $\theta 3$ of the respective R1 to R3 are input.

Next, it is judged whether or not $\theta i$ of the road Ri is in the range of $\pm 70°$ on the data input in S101 (S102). In the example of FIG. 5, the road R2 falls within this range, and so YES is given. If any road is not present in the range of $\pm 70°$ in S102, the curved road is not present, and thus it is judged that a curved road does not exist (S103).

On the other hand, If roads are present in the range of $\pm 70°$, it is judged whether or not 3 or more roads are present in the range of a $\pm 70°$ (S104). If the three or more roads are present in this range, it is impossible to judge which road is the curved road, and the flow transfers to S103. It is thus judged that the curved road is absent. On the other hand, if the one or two roads are present in the $\theta i$ range of $\pm 70°$, the road having the largest width Wi is represented by Rm and the width of this road is represented by Wm. According to the example of FIG. 5, R2 is Rm and W2 is Wm. Next, it is judged whether or not the road Ri which meets $\theta i = \pm 70°$ is present in addition to Rm (S106). If YES is given in S106, that is, if two roads are present in the range of $\theta i = \pm 70°$, the road having the smaller width is represented by Rm1 and its width is represented by Wm1 (S107). Then, it is judged whether or not a ratio (Wm/Wm1) between the width Wm of the road having the large width and the width Wm1 of the road having the small width is 1.5 or more (S108). If the two roads are compared in width and one road is much larger than the other, it can often be judged that the curved road is present. However, if the two roads are similar in size, it is impossible to judge which is the curved road. Thus, if NO is given in S108, it is judged that the curved road is absent (S103).

As can be understood from the above, if only one road is present in the $\theta i$ range of $\pm 70°$ in S106 and if one of the two roads has a much larger width in S108, the road Rm can be tentatively judged to be the curved road. In this embodiment, the obtained judgement is additionally treated to judge whether or not the curved road is present. This additional judgement will be described in reference to FIG. 8.

That is, the road Rm decided in the above manner is utilized as a base, and another road is represented by Rmi. The width of the road Rmi is represented by Wmi, and an angle of the road Rmi to the road Rm is represented by $\theta mi$, wherein the attached character $i$ is an integer of $i>0$ but it may be a negative integer.

Next, the angle $\theta Mi$ of the road Rmi other than the road Rm is determined, and it is judged whether or not the road Rmi having $\theta mi$ in the range $\pm 120°$ is present. If such a road is not present, it is certain that the road Rm is judged to be the curved road, and so the road Rm is judged to be the curved road and it is decided that the curved road is present (S203).

On the other hand, if it is judged in S202 that the road is present in the range of $\pm 120°$, it is next judged whether or not the road Rmi is present in the $\theta mi$ range of $\pm 90°$ (S204). That is, it is judged whether or not another road is present in the vicinity of the curved road Rm. If any other road is not present near by, it is judged whether or not Wm/Wmi>1.0 is met with regard to all the roads Rmi in the θmi range of ±120° (S205). This means the judgement as to whether or not the road in the vicinity of the road Rm has smaller width than the road Rm. If the road Rm is the widest road, it is correct that the road Rm should be regarded as the curved road, and thus it is judged that the curved road is present (S203). On the other hand, if the road Rm does not have the large width in S205, it is doubtful that the road Rm is the curved road, and it is judged that the curved road is not present (S207). Incidentally, in place of Wm/Wmi>1.0, a suitable value such as 0.8 can be set.

On the other hand, if another road is present in the range of ±90° on the basis of the road Rm in S204, it is judged whether or not this road is in the range of ±60° (S206). If the other road is present in the vicinity of the road Rm, it is difficult to judge that the road Rm is the curved road, and therefore It is judged that the curved road is absent (S207). On the other hand, if the other road is absent in the range of ±60°, it is judged whether or not Wm/Wmi>1.5 is met with regard to all the roads Rmi present in the range of ±90° (S208). That is, if the road present in the range of ±60° to ±90° has a much smaller width than the road Rm, it is considered that the road Rm is judged to be the curved road by a driver, and so it is judged that (S203). On the other present (S203). On the other hand, if the other road present in the range of ±60° to ±90° does not have a much smaller width than the road Rm, the road Rm is probably not judged to be the curved road, and so it is judged that the curved road is absent (S207). In judging whether or not the width is sufficiently large, in place of Wm/Wmi>1.5, another suitable value such as 2.0 can be set.

As can be understood from the above, only when the driver judges that the curved road is present without difficulty, is it judged that the curved road is present, and in other cases, it is judged that the curved road is absent, whereby the judgement which matches with the feeling of the driver can be carried out.

Figure 8:
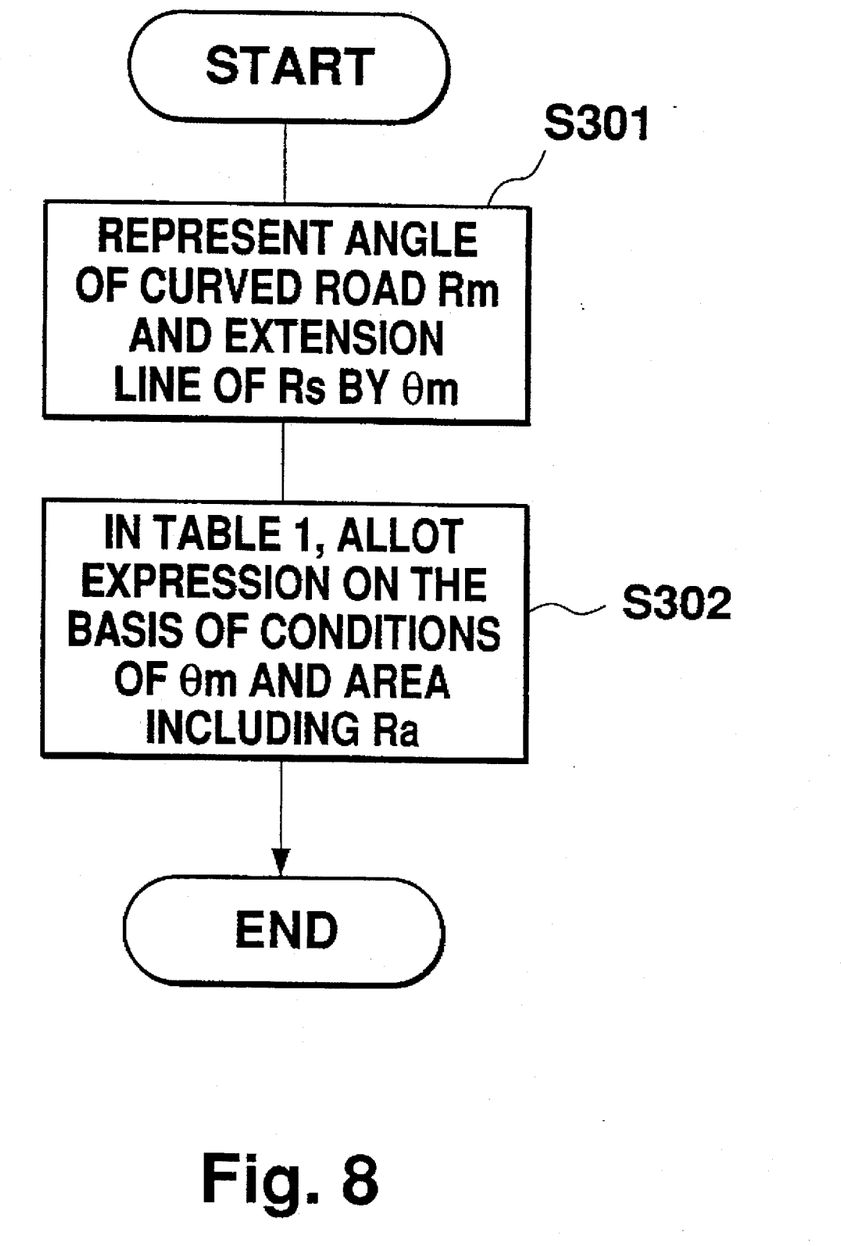
FIG. 8 is a flow chart of voice selection processing in the case that the curved road is present.
Figure 9:
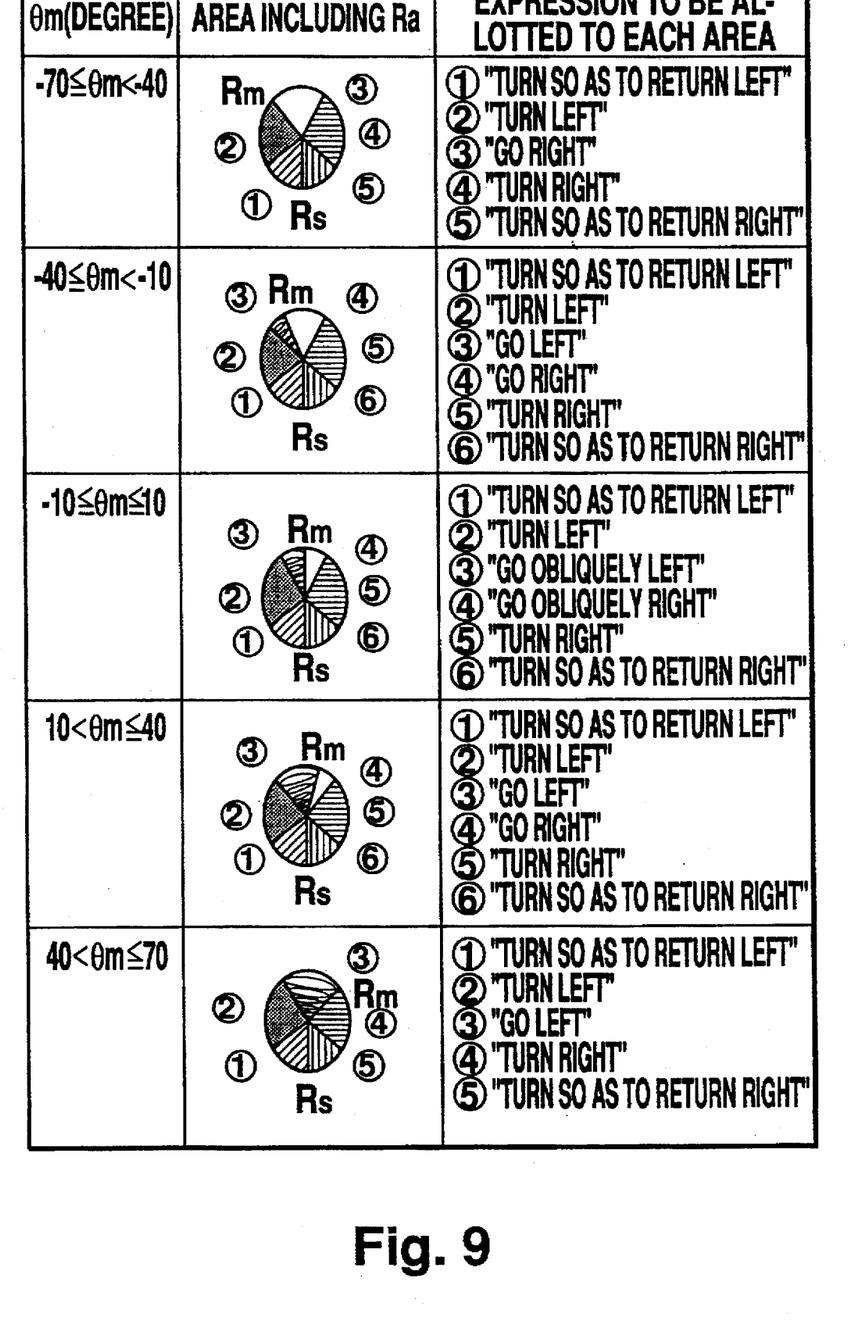
FIG. 9 is an illustrative view showing the allocation of a voice expression in the case that the curved road is present.

Next, a voice expression in the case that the presence of the curved road is judged by the above-mentioned flow will be described with reference to FIG. 8. In the first place, an angle of the road Rm to the extension line of the driving road Rs is represented by θm (S301), and as shown in FIG. 9, the expression of a voice guidance is allotted on the basis of a degree of θm, an area containing a road Ra to be next taken (a guide road) and the like (S302).

That is, in the ease that the road is in the range of −70≦θm<−40, the voice expression is allotted in accordance with the area of the guide road such as (1) "turn so as to return left", (2) "turn left", (3) "go right", (4) "turn right", and (5) "turn so as to return right". Since the curved road Rm is on the left side, the expression of (3) "turn right" is actually allotted in a predetermined range placed in front of the incoming road. The reason for this is as follows: the driver tends to judge that the curved road is in a substantially straight direction, and therefore in order to clearly distinguish from the curved road, the expression of "go right" is more proper. As typical expressions, variations such as "turn so as to return to this side", "largely turn to this side" are possible.

In the case that the road is in the range of −40≦θm≦−10, the expression of "go left" is employed in a little lefter range than the curved road. The reason for this is as follows: the curvature of the curved road to the left side is smaller than the above-mentioned case, and if the expression of "turn left" is employed in this range, it is difficult to discriminate from the largely curved road. Next, if the curved road is present in the range of −10≦θm≦−10, the expression of "go obliquely left" or "go obliquely right" is used for the road in a small angle range to the left or right of the curved road, whereby the suitable expression can be given for each area where the substantially straight road is present. Furthermore, if the curved road is curved to a right direction, the expression corresponding to the above-mentioned case where the road is curved to the left direction is employed.

Figure 10:
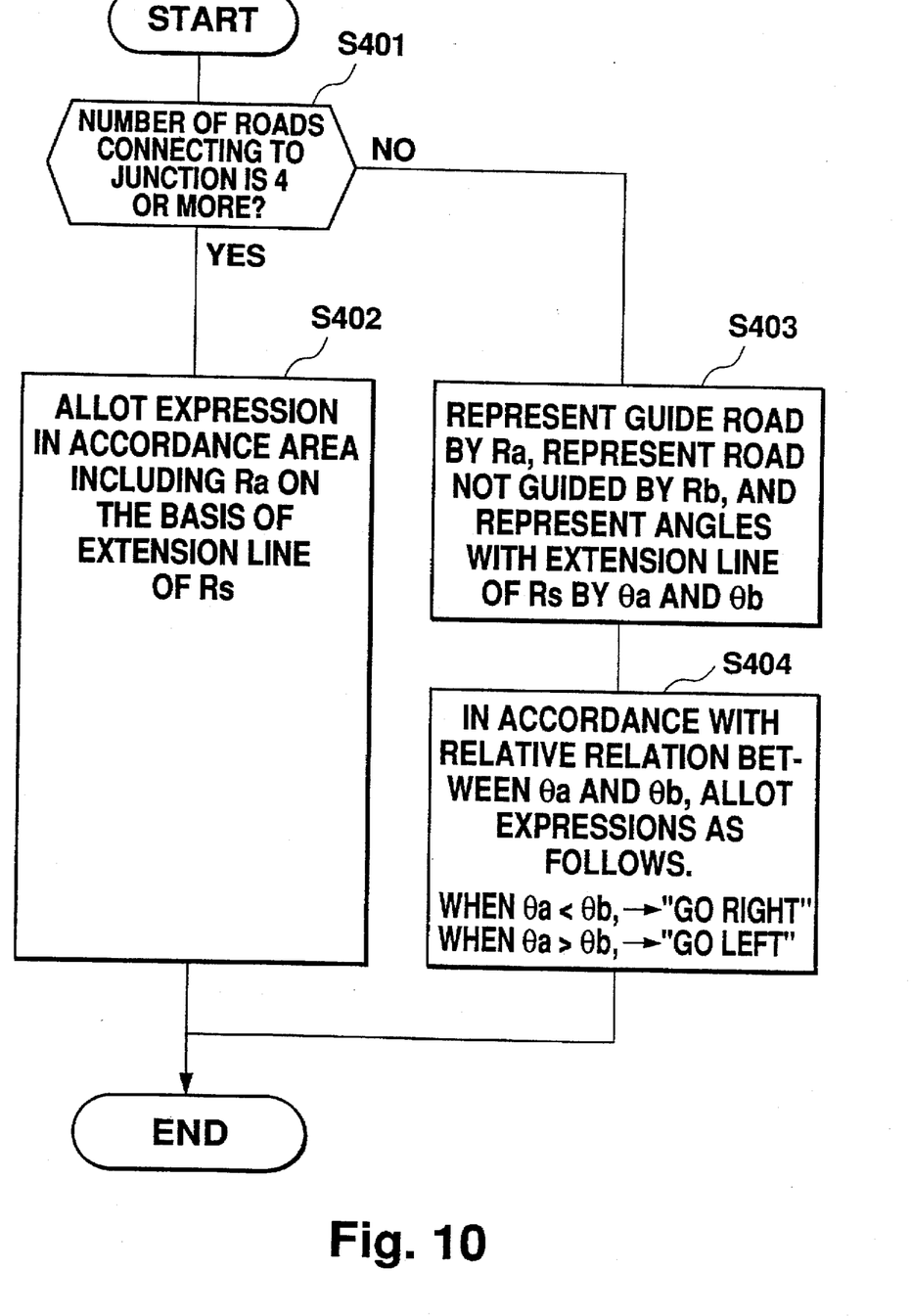
FIG. 10 is a flow chart of the voice selection processing in the case that the curved road is absent.

Next, the voice expression in the case that the curved road is absent will be described with reference to FIG. 10. In the first place, it is judged whether or not the number of roads connecting to a junction is 4 or more (S401). If the number of the roads connecting to the junction is 4 or more, expressions must be allotted to areas containing these roads. The expression for the case that the curved road is substantially straight (−10≦θm≦10) is allotted to the area containing the guide road Ra on the basis of the extension line of the incoming road Rs (S402). On the other hand, if the number of roads connecting to the junction is 3 or less, it is apparent that the incoming road, the guide road and one other road are connected to the junction (if the incoming road and the one other road only are present, this place is not the junction). Thus, one of the two roads is regarded as the guide road Ra, and the road which is not guided is represented by Rb. Angles of the guide road and the other road to the extension line of the incoming road Rs are represented by θa and θb, respectively (S403). For example, this falls under the case of FIG. 5 in which the incoming road Rs and only two roads R1 and R2 are present at the intersection and the guide road is the road R1. In this case, θ1=θa and θ2=θb. In accordance with a relative relationship between θa and θb, the following expressions are allotted (S404).

That is, if θa<θb, Y "go right"

if θa>θb, Y "go left" (in the example of FIG. 5, this expression is given).

As can be understood from the above, according to this embodiment, when only the two divided roads are present, the expression corresponding thereto can be allotted, whereby the driver can easily judge the road to be selected.

Figure 11:
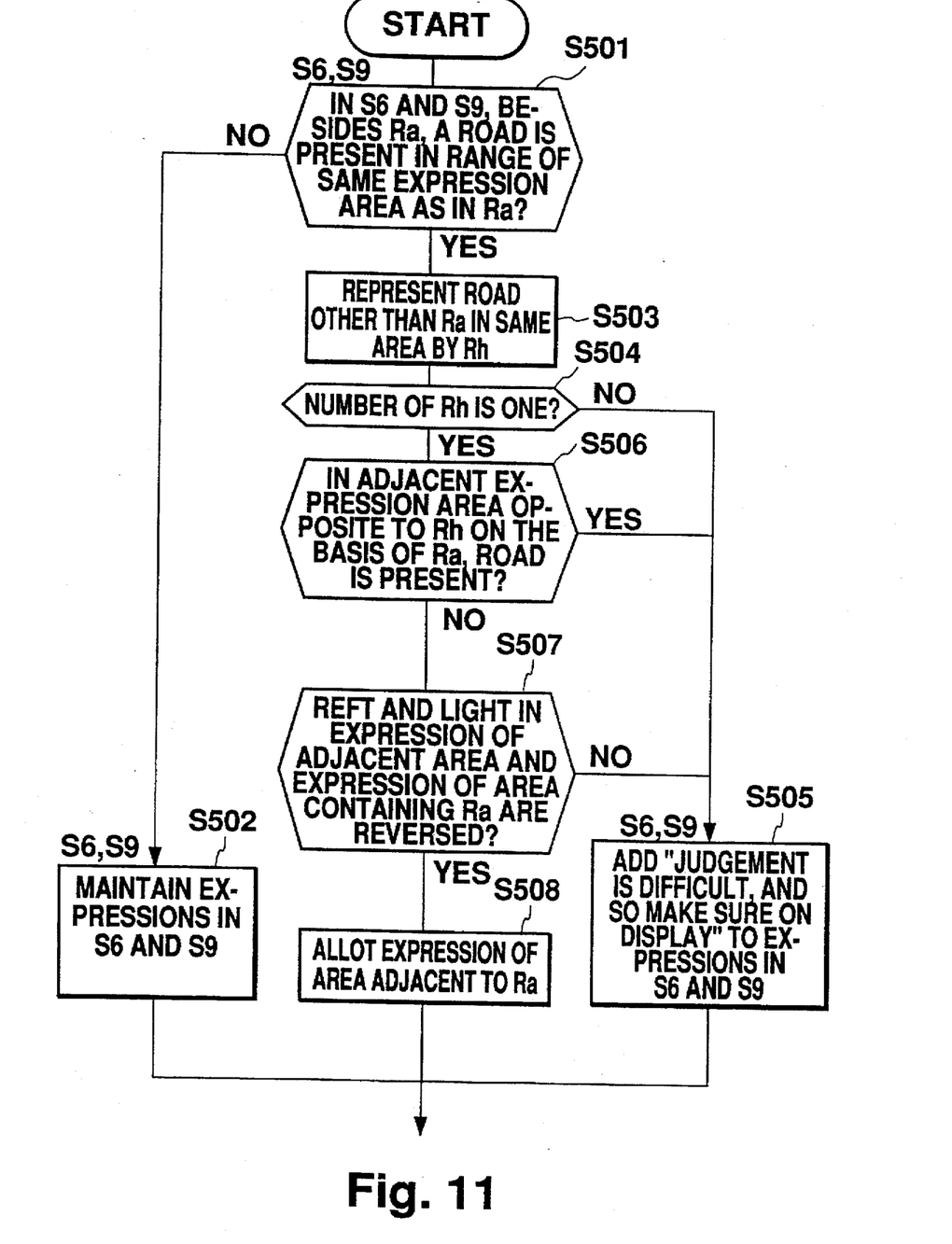
FIG. 11 is a flow chart illustrating the check and correcting operation of a voice expression.
Figure 12:
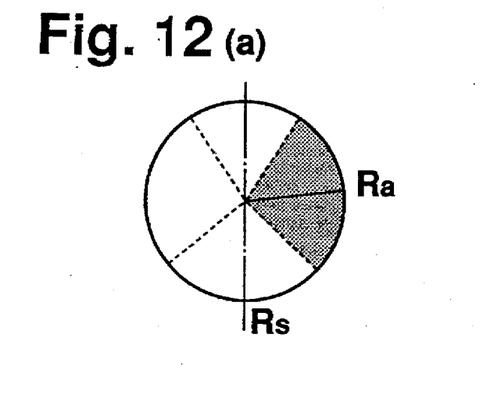
FIGS. 12(a) through 12(e) shows illustrative views regarding the alternation of the expression.

Next, the operation of "check and correction of the selected expression" in S7 of the flow chart in FIG. 4 will be described in reference to FIGS. 11 and 12(a through 12(e). In the first place, in the selection processing (S6) of the voice expression in the case that the curved road is present and in the selection processing (S9) of the voice expression in the case that the curved road is absent, it is judged whether or not a road is present in the same expression area as in the guide road Ra (S501). For example, as shown in FIG. 12(a), if the other road is absent in the expression area where the guide road Ra is present, it is not necessary to correct the expression, and so the flow transfers to the next processing without changing the expression (S502). On the other hand, as shown in FIG. 12(b), if the other road is present in the same expression area as in the guide road Ra, these two roads must be discriminated from each other and an expression for leading the car to the guide road must be employed. Therefore, the road other than the guide road Ra in the same area is first represented by Rh (S503). Then, it is judged whether or not there is only one other road Rh (S504). As shown in FIG. 12(c), if the other roads Rh are not one but plural, many roads exist in the same expression area, and it is very difficult to discriminate them. Therefore, the expression of "the judgement is difficult, and so clarify using the display" is added to the expressions decided in S6 and S9 (S505).

On the other hand, as shown in FIG. 12(e), if there is only one other road Rh, it is judged whether or not the expression for discriminating the guide road Ra from the other road Rh is usable. For this purpose, it is judged whether or not a road is present in an adjacent expression area opposite to the other road Rh on the basis of the guide road Ra (S506). If the road is absent in the adjacent expression area, it is judged whether or not right and left in the expression of the adjacent area and the expression of the area containing the road Ra are reversed. That is, in the case that the expression of the adjacent area changes, for example, from "go left" to "go right" and in the case that the expression of the road present in the same area is altered to that of the adjacent area, the driver might be rather confused by the change of the expression, and therefore the correction of the expression is not carried out. On the other hand, in the case that the expression is not reversed, the expression of the area adjacent to the guide road Ra is allotted (S508). For example, when the expression "turn right" is changed to the expression "go right", the driver can be informed of the guide road Ra near to a substantially straight direction to the other road Rh largely curved to the right.

On the other hand, if a road is present in the adjacent expression area in S506, the discrimination of the guide road from this road is complicated, and thus, the flow advances to S505. If left and right are reversed by the change to the expression of the adjacent area in S507, the flow transfers to S505.

The allotment of the areas (1) to (6) in FIG. 9 can be previously determined by an area ratio. For example, in the case of −70°≦θm≦−40°, (1):(2)=2:3 or (3):(4):(5)=1:2:1 can be set.

As described above, according to the present invention, when the curved road is present, the indication which matches with the feeling of the driver can be given on the basis of the curved road. Even if the curved road is absent and if only one other road is present in addition to the guide road, suitable guidance can be given. In the case that the road for the same expression as in the guide road is present in addition to the guide road, the expression is changed to a better expression or attracts the driver's attention in compliance with the situation. Therefore, according to the car leading device using the voice of this embodiment, the route guidance can always be carried out in compliance with the requirement of the driver.

Another Embodiment

Figure 13:
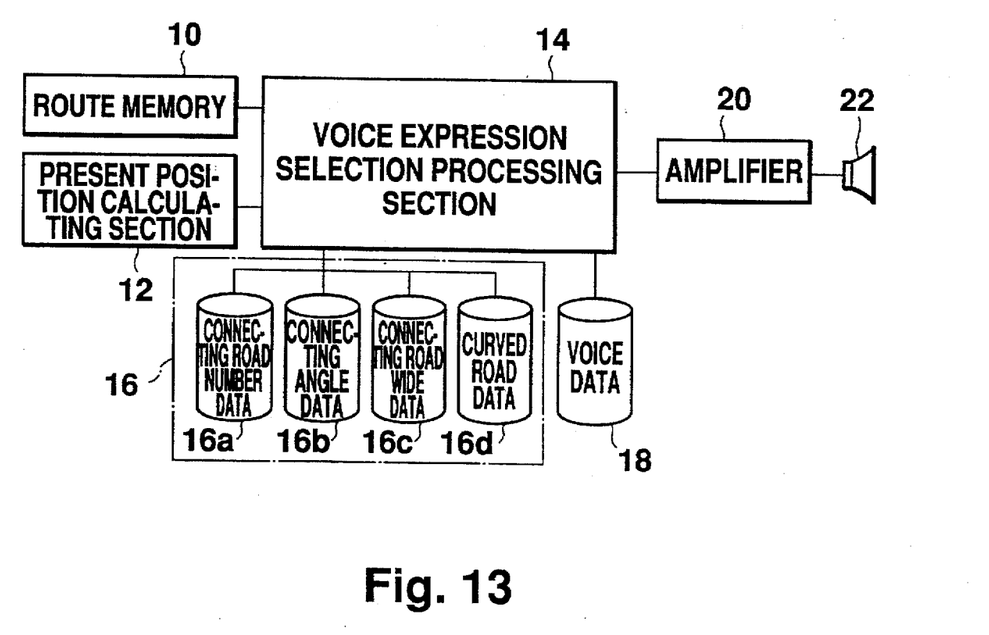
FIG. 13 is a block diagram showing the constitution of another embodiment.

FIG. 13 shows another embodiment of the present invention, and a junction data storage section 16 contains a curved road data storage section 16d. This curved road data storage section stores data regarding which road of all the roads at a junction is a curved road. That is, If three roads A, B and C are present at the junction, and when a car comes along the road A, the road B is the curved road; when the car comes along the road B, the road A is the curved road; or when the car comes along the road C, the curved road is absent. In this case, the data storage section has the data that "a curved road is present, and the curved road is A" for the road A, the data that "a curved road is present, and a curved road is B" for the road B, and the data that "a curved road is absent" for the road C. Thus, if the incoming road is decided, it can be judged whether or not the curved road is present or which road is the curved road from the above-mentioned data.

Now, according to this embodiment, in S3 of FIG. 5, it can be judged simply by reading the data from the curved road data storage section 16 whether or not the curved road is present, and in S4, it can also be judged whether or not the guide road is the curved road. Therefore, as shown in FIGS. 6 and 7, the judgement of the curved road can be omitted, and so the car-leading device can be simplified. However, since the data of this curved road must be previously prepared, the operation for preparing the data is required.

Still Another Constitutional Embodiment

In still another embodiment, with regard to the guidance at the above-mentioned intersection, when the intersection is detected, information as to whether or not this intersection is a rotary intersection is read from a junction data storage section 16 contained in a map information storage section 15. Furthermore, it is judged by an arithmetic section 13 whether or not the intersection is the rotary intersection.

Figure 14:
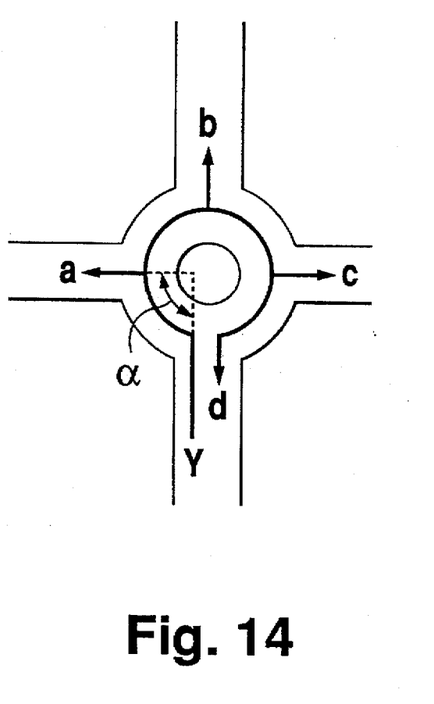
FIG. 14 shows an illustrative view regarding a route guide at a rotary intersection in the embodiment.

If it is judged that the approached intersection is the rotary intersection, a route guidance special to the rotary intersection is carried out. When a car approaches the rotary intersection from the direction of an arrow Y as shown in FIG. 14, the route guide in compliance with an outgoing direction is carried out. That is, the guidance content is changed in accordance with an angle (α) made by an incoming road and a road to be guided. For example, in the case of 0°<α<165°, the route guidance for a right direction is given; in the case of 165°≦α≦195°, the guidance for a straight direction is given; in the case of 195°≦α<360°, the guidance for a left direction is given; and in the case of returning to the driven road (α=360°), the guidance of a returning direction is given. In the case of FIG. 14, "go around the rotary junction and turn to the left" is issued for a; "go around the rotary junction and go straight" is issued for b; "go around the rotary junction and turn to the right" is issued for c; and "go around the rotary junction and return" is issued for d. In particular, by using the expression "go around" for the directions c and d, a driver can be urged to a driving operation in accordance with the route special to the rotary intersection.

Furthermore, the position where the route guidance is carried out is the same as in the case of a usual intersection. For example, when a car travels on a road having one lane on one side, the guidance is given 300 m in front of the intersection, and when the car travels on a road having two lanes on one side, the guidance is given 700 m in front of the intersection. In addition, even when the intersection draws immediately near, the route guidance is given.

Figure 15:
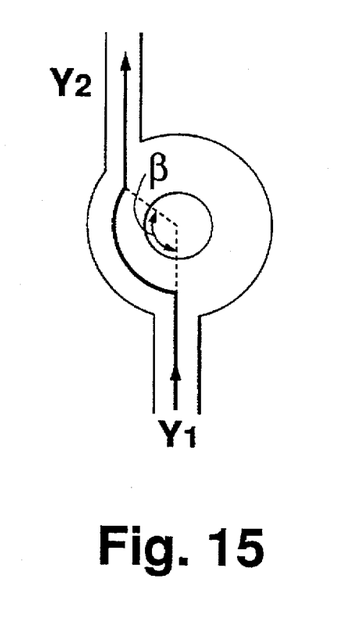
FIG. 15 shows an illustrative view regarding the route guide at another rotary intersection in the embodiment.

In this embodiment, the route guidance at the rotary intersection is classified into "turn left", "turn right", "go straight" and the like in accordance with an angle (α) made by the incoming road and the outgoing road, but the guidance may be issued in compliance with an angle (β) turning around the rotary. For example, in the case of such a rotary intersection as in FIG. 15, an angle made by a direction Y1 of the incoming road and a direction Y2 of the outgoing road is 180°, but the angle turning around the rotary intersection is about 100° and thus in this case, it is judged that the guidance is "turn left".

As can be understood from the foregoing, according to the present invention, it is judged whether or not an intersection is a rotary intersection, and a driver is informed of the judgement. Therefore, the driver can drive in accordance with the rotary intersection. That is, at the rotary intersection, even when the driver turns right, it is necessary that he turns left to get onto the rotary junction, and so he can prepare for the rotary intersection.

What is claimed is:

1. A device for leading a vehicle along a route to a destination at a junction, said device comprising:

junction information storage means for storing junction information including data as to whether a junction is a rotary junction;

control means for determining the entry and exit guidance information in accordance with incoming and outgoing roads to and from said rotary junction, if it is judged that a junction about to be entered is a rotary junction; and voice guidance means for outputting said guidance information determined by said control means before said vehicle enters said rotary junction.

2. The device according to claim 1, wherein:

said voice guidance means determines guidance information, on a basis of an angle formed between a direction of a route as it enters said junction and a direction of a route to be selected as it goes out from said junction.

3. The device according to claim 2, wherein:

said guidance information is carried out through a selection of one guidance pattern out of a predetermined plurality of guidance patterns, in accordance with said angle.

4. The device according to claim 3 wherein:

at least one guidance pattern among said predetermined plurality of guidance patterns contains a phrase meaning turning around a rotary junction.

5. The device according to claim 2, wherein:

guidance information for a right turn is given when said angle is greater than 0° and less than 165°.

6. The device according to claim 2, wherein:

guidance information for continuing straight ahead is given when said angle is greater than 165° and less than 195°.

7. The device according to claim 2, wherein:

guidance information for a left turn is given when said angle is greater than 195° and less than 360°.

8. A device for leading a vehicle along a route to a destination at a junction, said device comprising:

junction information storage means for storing junction information including data as to whether a junction is a rotary junction;

rotary judging means for judging as to whether or not a junction about to be entered is a rotary junction, on a basis of said data stored in said junction information storage means; and voice guidance means for guiding through voice that said junction about to be entered is a rotary junction when said rotary judging means judges said junction is a rotary junction, said voice guidance means determining guidance information on a basis of an angle formed between said rotary junction and a selected route going out from said rotary junction.

9. The device according to claim 8, wherein:

said guiding through voice is carried out through a selection of one guidance pattern out of predetermined plurality of guidance patterns, in accordance with said angle.

10. The device according to claim 9, wherein:

at least one guidance pattern among said predetermined plurality of guidance patterns contains a phrase meaning turning around a rotary junction.

11. The device according to claim 8, wherein:

said guidance information is prepared on a basis of incoming and outgoing roads to and from said rotary junction, thereby giving guidance as to through which way said vehicle should exit from said rotary junction when said vehicle enters said rotary junction.

12. A device for leading a vehicle along a route to a destination at a junction, said device comprising:

junction information storage means for storing junction information including data as to whether a junction is a rotary junction;

rotary judging means for judging as to whether or not a second junction after a first junction about to be entered is a rotary junction, on a basis of said data stored in said junction information storage means; and voice guidance means for providing entry and exit guidance information in accordance with incoming and outgoing roads to and from said second junction, when said rotary judging means judges said second junction is a rotary junction, and before said vehicle enters said first junction.

13. The device according to claim 12, wherein:

said voice guidance means determines guidance information, on a basis of an angle formed with a route entering said second junction and a route to be selected in going out from said second junction.

14. The device according to claim 13, wherein:

said guiding through voice is carried out through a selection of one guidance pattern out of a predetermined plurality of guidance patterns, in accordance with said angle.

15. The device according to claim 14, wherein:

at least one guidance pattern among said predetermined plurality of guidance patterns contains a phrase meaning turning around a rotary junction.

* * * * *